United States Patent
Mishra

(10) Patent No.: US 12,192,163 B2
(45) Date of Patent: *Jan. 7, 2025

(54) SYSTEMS AND METHODS FOR ADVERTISING INTERNET PROTOCOL (IP) VERSION 4 NETWORK LAYER ROUTING INFORMATION WITH AN IP VERSION 6 NEXT HOP ADDRESS

(71) Applicant: Verizon Patent and Licensing Inc., Basking Ridge, NJ (US)

(72) Inventor: Gyan S Mishra, Boyds, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/311,433

(22) Filed: May 3, 2023

(65) Prior Publication Data

US 2023/0275869 A1    Aug. 31, 2023

Related U.S. Application Data

(63) Continuation of application No. 17/302,154, filed on Apr. 26, 2021, now Pat. No. 11,658,934.

(51) Int. Cl.
*H04L 61/251* (2022.01)
*H04L 45/50* (2022.01)
(Continued)

(52) U.S. Cl.
CPC ............ *H04L 61/251* (2013.01); *H04L 45/50* (2013.01); *H04L 47/17* (2013.01);
(Continued)

(58) Field of Classification Search
None
See application file for complete search history.

(56) References Cited

U.S. PATENT DOCUMENTS 7,246,175 B1 * 7/2007 Tappan ................. H04L 61/251
370/392
9,191,318 B1 11/2015 Van De Velde et al.
(Continued)

OTHER PUBLICATIONS

"Multiprotocol BGP", Juniper, Mar. 26, 2021, https://web.archive.org/web/20210414120057/https://www.juniper.net/documentation/us/en/software/junos/bgp/topics/topic-map/multiprotocol-bgp.html (Capture on waybackmachine from Apr. 14, 2021).
(Continued)

*Primary Examiner* — Brian Whipple

(57) ABSTRACT

A first network device associated with a network may establish an Internet protocol version 6 Multiprotocol BGP session with a second network device associated with the network. The first network device and second network device are both capable of forwarding both IPv4 and IPv6 packets with only an IPv6 address configured on the interface of both the first network device and second network device. The first network device may exchange Multiprotocol Reachability capability with second network device for corresponding 2-tuple Address Family Identifier/Subsequent Address Family Identifier. The first network device may advertise Internet protocol version 4 network layer reachability information and may advertise Internet protocol version 6 network layer reachability information with IPv6 extended next hop encoding using Internet Assigned Numbering Authority assigned capability code value 5 to second network device.

20 Claims, 9 Drawing Sheets

(51) Int. Cl.
*H04L 47/17* (2022.01)
*H04L 61/5069* (2022.01)
*H04L 69/325* (2022.01)
*H04L 101/659* (2022.01)

(52) U.S. Cl.
CPC ........ *H04L 61/5069* (2022.05); *H04L 69/325* (2013.01); *H04L 2101/659* (2022.05)

(56) References Cited

U.S. PATENT DOCUMENTS

| | | |
|---|---|---|
| 2008/0170578 A1 | 7/2008 | Ould-Brahim |
| 2014/0189160 A1* | 7/2014 | Haddad ............... H04L 61/5007 709/245 |
| 2014/0215179 A1* | 7/2014 | Matsuhira ........... G06F 12/0813 711/211 |
| 2015/0295888 A1 | 10/2015 | Maslak |
| 2018/0109450 A1 | 4/2018 | Filsfils et al. |
| 2019/0166048 A1* | 5/2019 | Srinivasan ............ H04L 45/745 |
| 2021/0336870 A1 | 10/2021 | Zhao et al. |

OTHER PUBLICATIONS

Aggarwal, et al., "BGP Encodings and Procedures for Multicast in MPLS/BGP IP VPNs", Internet Engineering Task Force (IETF), Feb. 2012, 59 Pages.

Bates, et al., "Multiprotocol Extensions for BGP-4", Network Working Group, Jan. 2007, 12 Pages.

Bradner, "Key words for use in RFCs to Indicate Requirement Levels", https://tools.ietf.org/html/rfc2119, Mar. 1997, 4 pages.

Chen, et al., "Dynamic Capability for BGP-4 drafl-ielf-idr-dynamic-cap-14.txt", Network Working Group, Dec. 5, 2011, 7 Pages.

Cotton, et al., "Guidelines for Writing an IANA Considerations Section in RFCs", Internet Engineering Task Force (IETF), Jun. 2017, 47 Pages.

De Clercq, et al., "BGP-MPLS IP Virtual Private Network (VPN) Extension for IPv6 VPN", Network Working Group, Sep. 2006, 18 Pages.

De Clercq, et al., "Connecting IPv6 Islands over IPv4 MPLS Using IPv6 Provider Edge Routers (6PE)", Network Working Group, Feb. 2007, 14 Pages.

Hinden, et al., "IP Version 6 Addressing Architecture", Network Working Group, Feb. 2006, 25 Pages.

Le Faucheur, et al., "Advertising IPv4 Network Layer Reachability Information with an IPv6 Next Hop", Network Working Group, May 2009, 10 Pages.

Leiba, "Ambiguity of Uppercase vs Lowercase in RFC 2119 Key Words", Internet Engineering Task Force (IETF), May 2017, 4 Pages.

Li, et al., "Softwire Problem Statement", Network Working Group, Jul. 2007, 23 Pages.

Marques, et al., "Constrained Route Distribution for Border Gateway Protocol/MultiProtocol Label Switching (BGP/MPLS) Internet Protocol (IP) Virtual Private Networks (VPNs)", Network Working Group, Nov. 2006, 14 Pages.

Marques, "Use of BGP-4 Multiprotocol Extensions for IPv6 Inter-Domain Routing", Network Working Group, Mar. 1999, 5 Pages.

Mishra, et al., "Deployment Guidelines for Edge Peering IPv4-NLRI with IPv6-NH draft-mishra-bess-deployment-guide-ipv4nlri-ipv6nh-02", BESS Working Group, Mar. 23, 2021, 12 Pages.

Mishra, et al., "IPv4 NLRI with IPv6 Next Hop Use Cases drafl-mishra-bess-deplment-guidlin-ipv4nlri-ipv6nh-00", BESS Working Group, Mar. 22, 2021, 12 Pages.

Mishra, et al., "IPv4 NLRI with IPv6 Next Hop Use Cases drafl-mishra-bess-ipv4nlri-ipv6nh-use-cases-10".

Rosen, et al., "BGP/MPLS IP Virtual Private Networks (VPNs)", Network Working Group, Feb. 2006, 47 Pages.

Rosen, et al., "Multicast in MPLS/BGP IP VPNs", Internet Engineering Task Force (IETF), Feb. 2012, 88 Pages.

Rosen, et al., "Provisioning, Auto-Discovery, and Signaling in Layer 2 Virtual Private Networks (L2VPNs)", Internet Engineering Task Force (IETF), Jan. 2011, 32 Pages.

Rosen, "Using BGP to Bind MPLS Labels to Address Prefixes", Internet Engineering Task Force (IETF), Oct. 2017, 23 Pages.

Scudder, et al., "Capabilities Advertisement with BGP-4", Network Working Group, Feb. 2009, 7 Pages.

Wu, et al., "Softwire Mesh Framework", Network Working Group, Jun. 2009, 31 Pages.

\* cited by examiner

SYSTEMS AND METHODS FOR ADVERTISING INTERNET PROTOCOL (IP) VERSION 4 NETWORK LAYER ROUTING INFORMATION WITH AN IP VERSION 6 NEXT HOP ADDRESS

RELATED APPLICATION

This application is a continuation of U.S. patent application Ser. No. 17/302,154, entitled "SYSTEMS AND METHODS FOR ADVERTISING INTERNET PROTOCOL (IP) VERSION 4 NETWORK LAYER ROUTING INFORMATION WITH AN IP VERSION 6 NEXT-HOP ADDRESS," filed Apr. 26, 2021, which is incorporated herein by reference in its entirety.

BACKGROUND

Border gateway protocol (BGP) is a standardized exterior gateway protocol designed to exchange routing and reachability information among autonomous systems (ASs). BGP is classified as a path-vector routing protocol, and makes routing decisions based on paths, network policies, or rule sets configured by a network administrator. BGP used for routing within an AS (Autonomous System) is called interior BGP (iBGP) and BGP used for routing outside of the AS (Autonomous System) is called exterior BGP (eBGP).

DETAILED DESCRIPTION OF PREFERRED EMBODIMENTS

Figure 1A:
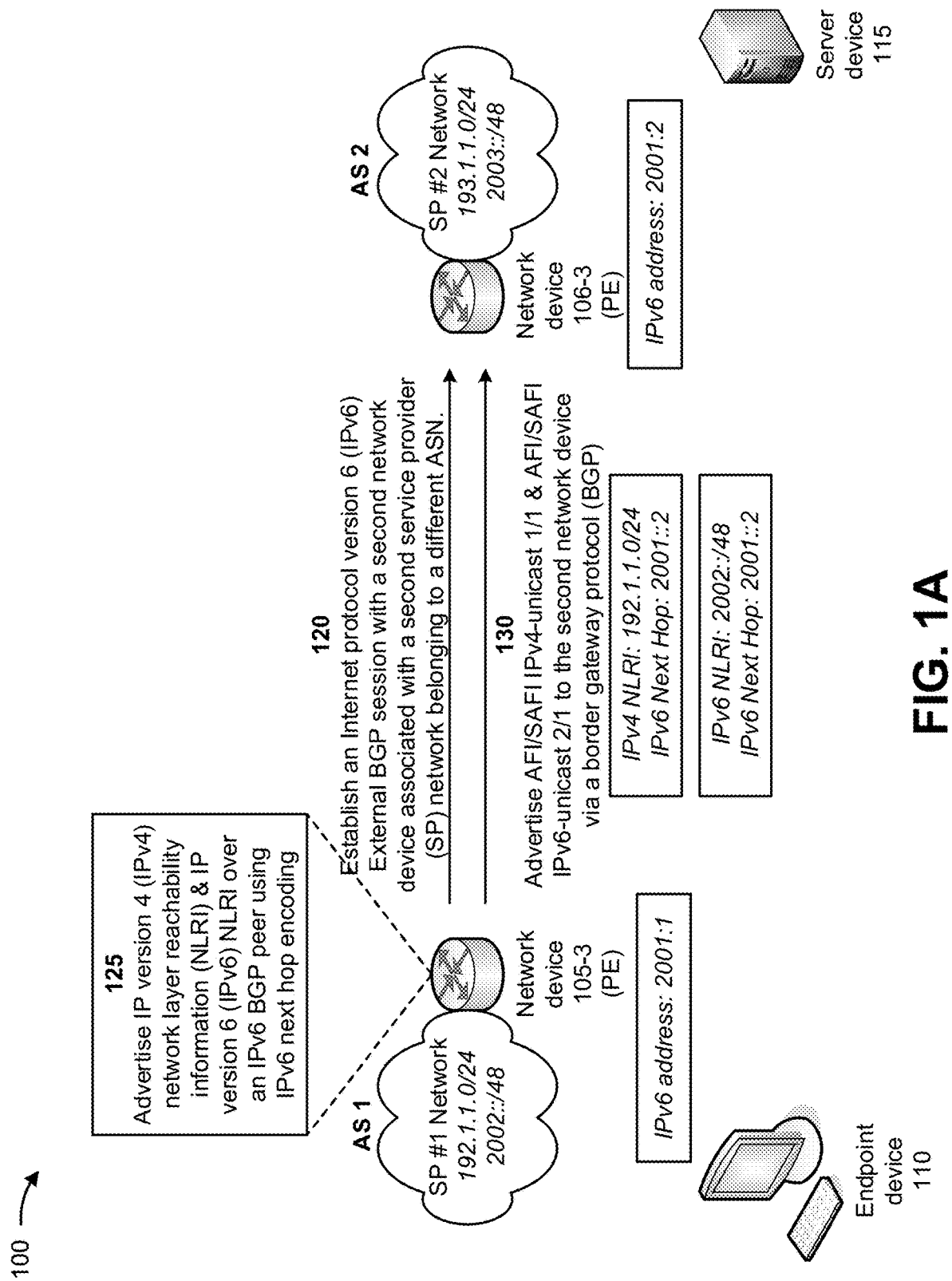
FIGS. 1A-1E are diagrams of an example associated with advertising IP version 4 (IPv4) network layer routing information (NLRI) with an IP version 6 (IPv6) Next-Hop.

The following detailed description of example implementations refers to the accompanying drawings. The same reference numbers in different drawings may identify the same or similar elements.

Multiprotocol BGP (MP-BGP) provides an ability to associate a network layer protocol with Next-Hop information and NLRI being advertised. BGP advertises IP version 4 (IPv4) and IP version 6 (IPv6) NLRI using Multiprotocol BGP (MP-BGP) reachability capability (e.g., referred to hereinafter as MP_REACH capability), which is exchanged between BGP Peers for a particular Address Family Identifier (AFI) and a Subsequent Address Family Identifier (SAFI) 2-tuple combination being advertised using IPv4 or IPv6 Next-Hop encodings. External BGP (eBGP) peering types are referred to hereinafter as Provider Edge (PE)-Customer Edge (CE), called "PE-CE" peering, or Provider-Edge (PE)-Provider Edge (PE), called "PE-PE" peering, with both scenarios referred to hereinafter as "Edge-Peering." Internal BGP (iBGP) peering type Provider Edge (PE) to RR (Route Reflector) peering is referred to hereinafter as "Core-Peering." The "Customer Edge" network device will be referred to hereinafter as "CE". The "Provider Edge" network device will be referred to hereinafter as "PE". The "Route Reflector" network device will be referred to hereinafter as "RR".

Historically, MP-BGP would advertise IPv4 and IPv6 NLRI and set the Next-Hop to the address family to which it belongs, as the NLRI advertised would have to match the protocol of the Next-Hop. MP-BGP with the BGP capability extension for Next-Hop encoding can now dynamically discover whether they can exchange IPv4 NLRI and VPN-IPv4 NLRI, MVPN-IPv4 NLRI, for example, with an IPv6 Next-Hop. This BGP Next-Hop encoding extension can be applied to all External BGP peering. AFI/SAFI IPv4 NLRI, VPN-IPv4 NLRI, MVPN-IPv4, for example, would not have to be carried by the same matching Next-Hop using the address family IPv4 that the NLRI belongs to, and now can be carried by the IPv6 address family for all AFI/SAFI 2-tuple combinations that exist today and all future AFI/SAFI 2-tuple combinations. The "Soft-Wire" mesh framework concept is based on the overlay and underlay technology framework, where the underlay acts as the "transport" layer and the overlay is a Virtual Private Network (VPN) overlay, and acts as the tunneled "virtualization" layer containing the customer payload. The concept of a "Soft-Wire" is based on transmission of IPv6 packets at the edge of the network by tunneling the IPv6 packets over an IPv4 Core. The concept of a "Soft-Wire" is also based on transmission of IPv4 packets at the edge of the network by tunneling the IPv4 packets over an IPv6 Core. With implementations described herein, the "Soft-Wire" continues to terminate on the PE network device. Implementations described herein include the transmission of IPv4 packets related to "Edge-Peering," and the IANA (Internet Assigned Numbering Authority) assigned capability value "5" Extended Next-Hop encoding over a pure IPv6 transport peer and forwarding of IPv4 packets over the "Edge-Peering," over an IPv6-Only interface configured on each adjacent network device. Implementations described herein include the transmission of IPv4 packets at the edge of the network, "Edge-Peering," by forwarding IPv4 packets over an IPv6-Only interface network devices forwarding plane, and advertising control plane routing information IPv4 NLRI and IPv6 NLRI with IPv6 next hop encoding over a Pure IPv6 Transport peer which now can be applied to any of the following AFI/SAFI 2-tuples combinations, as well as any AFI/SAFI 2-tuple combination developed in the future: AFI/SAFI 1/1 IPv4 NLRI used for Unicast; AFI/SAFI 1/2 IPv4 NLRI used for Multicast; AFI/SAFI 1/4 IPv4 NLRI with MPLS Labels; AFI/SAFI 1/5 IPv4 MCAST-VPN; AFI/SAFI 1/6 IPv4 NLRI used for Dynamic Placement of Multi Segment Pseudowires; AFI/SAFI 1/7 IPv4 Tunnel Encapsulation SAFI; AFI/SAFI 1/8 IPv4 MCAST-VPLS; AFI/SAFI 1/64 IPv4 Tunnel SAFI; AFI/SAFI 1/65 IPv4 Virtual Private LAN Service (VPLS); AFI/SAFI 1/66 IPv4 BGP MDT SAFI; AFI/SAFI 1/67 IPv4 BGP 4over6 SAFI; AFI/SAFI 1/68 IPv4 BGP 6over4 SAFI; AFI/SAFI 1/69 IPv4 Layer-1 VPN Auto Discovery Information; AFI/SAFI 1/70 IPv4 BGP EVPNs; AFI/SAFI 1/71 IPv4 BGP-LS; AFI/SAFI 1/72 IPv4 BGP-LS-VPN; AFI/SAFI 1/73 IPv4 SRTE Policy SAFI; AFI/SAFI 1/74 IPv4 SD-WAN Capabilities; AFI/SAFI 1/75 IPv4 Routing Policy SAFI; AFI/SAFI 1/76 IPv4 Classful-Transport SAFI; AFI/SAFI 1/78 IPv4 MCAST-TREE; AFI/SAFI 1/128 IPv4 VPN-MPLS-Labeled VPN Address; AFI/SAFI 1/129 IPv4 MVPN-Multicast for BGP/MPLS IP Virtual Private Networks (VPNs); AFI/SAFI 1/132 IPv4 Route Target Constraint; AFI/SAFI 1/133 IPv4 BGP FlowSpec—Dissemination of Flow Specification rules; AFI/SAFI 1/134 IPv4 L3VPN FlowSpec—Dissemination of Flow Specification rules; AFI/SAFI 1/140 IPv4 VPN auto-discovery.

Today all External BGP peering advertisement of IPv4 address family with any SAFI over an IPv6 Core is done using a separate BGP peer for IPv4 NLRI and a separate BGP peer for IPv6 NLRI as the NLRI advertised matches the BGP Next-Hop address family. This requires BGP peering connections, such as provider edge (PE) network devices and customer edge (CE) network devices, to provide IPv4 interfaces, mandates provision of IPv4 point-to-point infrastructure links, creates memory issues associated with storing IPv4 addresses, and increases costs associated with administration and network management of IPv4 peer network devices. Furthermore, IPv4 addresses are currently facing depletion issues.

Thus, current techniques for handling IPv4 addresses waste computing resources (e.g., processing resources, memory resources, communication resources, and/or the like), network resources, and/or other resources associated with providing and maintaining IPv4 interfaces on network devices, providing and maintaining the IPv4 point-to-point infrastructure links, storing the IPv4 addresses, managing IPv4 peer network devices, handling the IPv4 address depletion issues, among other examples.

Some implementations described herein relate to a network device that advertises IPv4 NLRI with an IPv6 Next-Hop. For example, a first network device associated with a network may establish a single IPv6 session acting a pure transport mechanism with a second network device associated with the network. The first network device may advertise IPv4 NLRI and IPv6 NLRI using IPv6 Next-Hop encoding to the second device by utilizing BGP Extended Next-Hop Encoding capability for dynamic discovery of whether the peer can exchange IPv4 NLRI with an IPv6 Next-Hop.

In this way, the first network device may advertise IPv4 NLRI with an IPv6 Next-Hop. The first network device may utilize the Next-Hop encoding of IPv4 NLRI with an IPv6 Next-Hop address to be used for eBGP peering between CE network device and PE network device. The first network device may be a PE network device, a CE network, and/or the like. The first network device will eliminate IPv4 peering, which may provide significant operational expenditure savings. This, in turn, conserves computing resources, networking resources, and/or other resources that would otherwise have been wasted with providing and maintaining IPv4 interfaces on network devices, providing and maintaining the IPv4 point-to-point infrastructure links, storing the IPv4 addresses, managing IPv4 peer network devices, handling the IPv4 address depletion issues, among other examples.

Figure 1B:
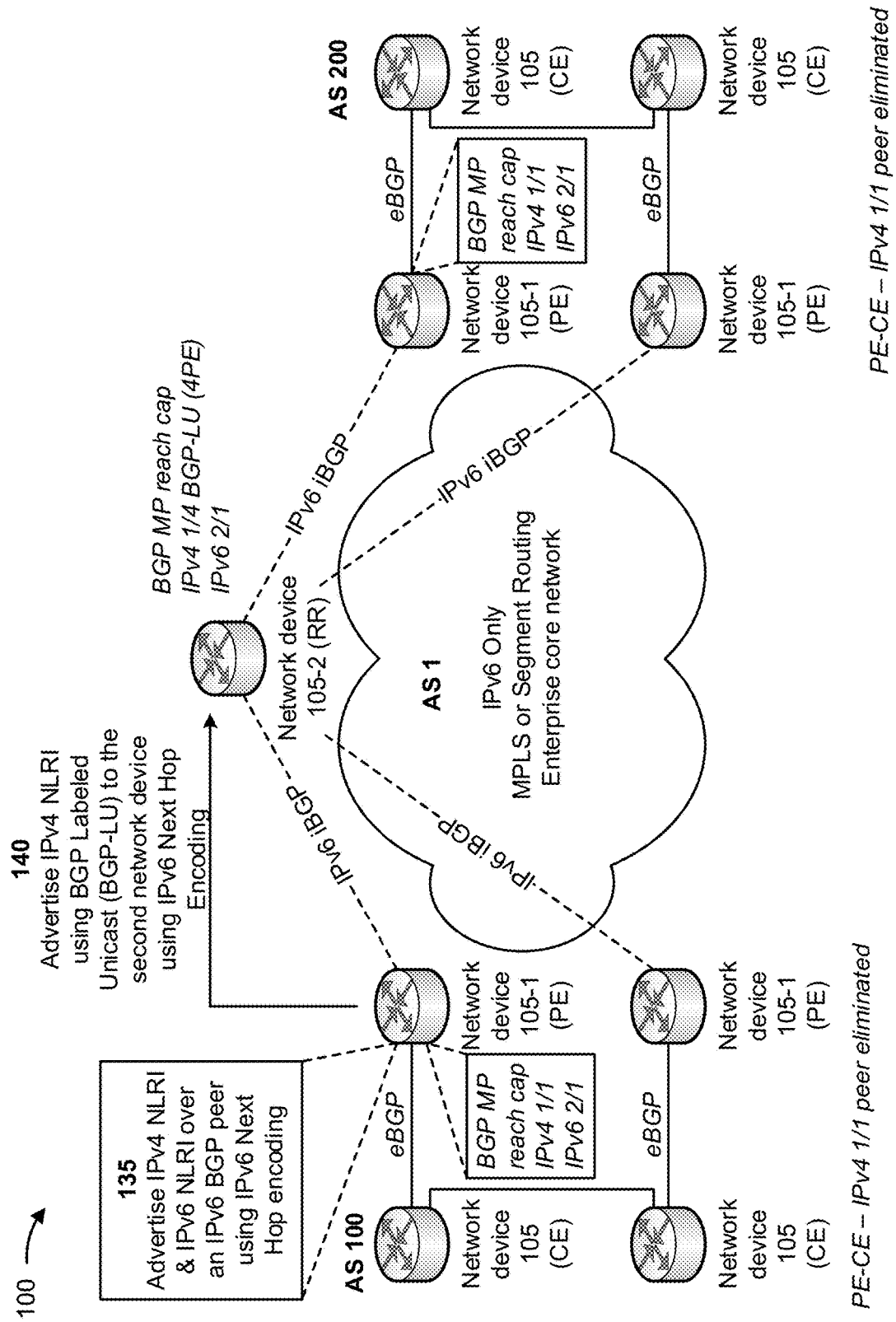
Figure 1C:
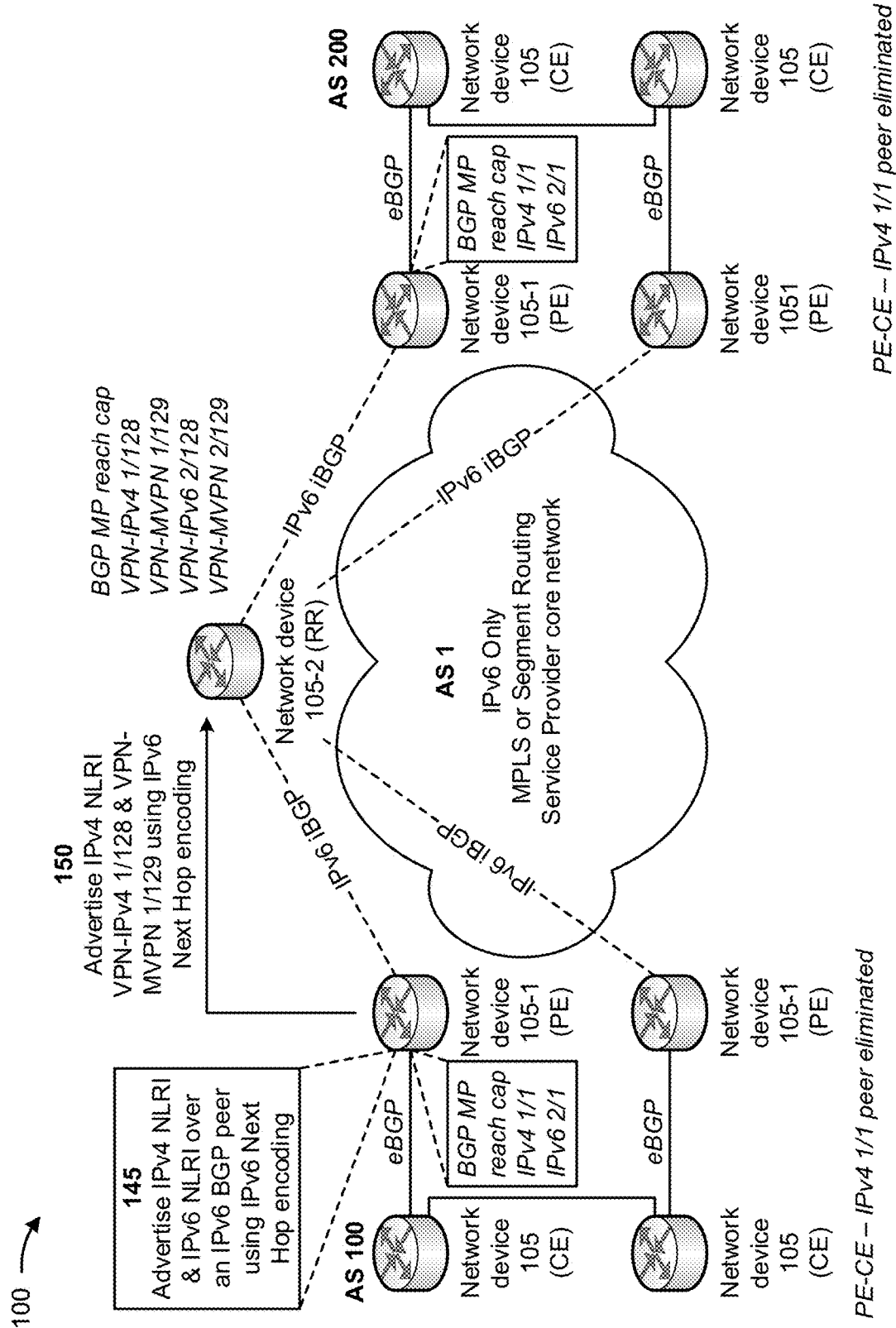
Figure 1D:
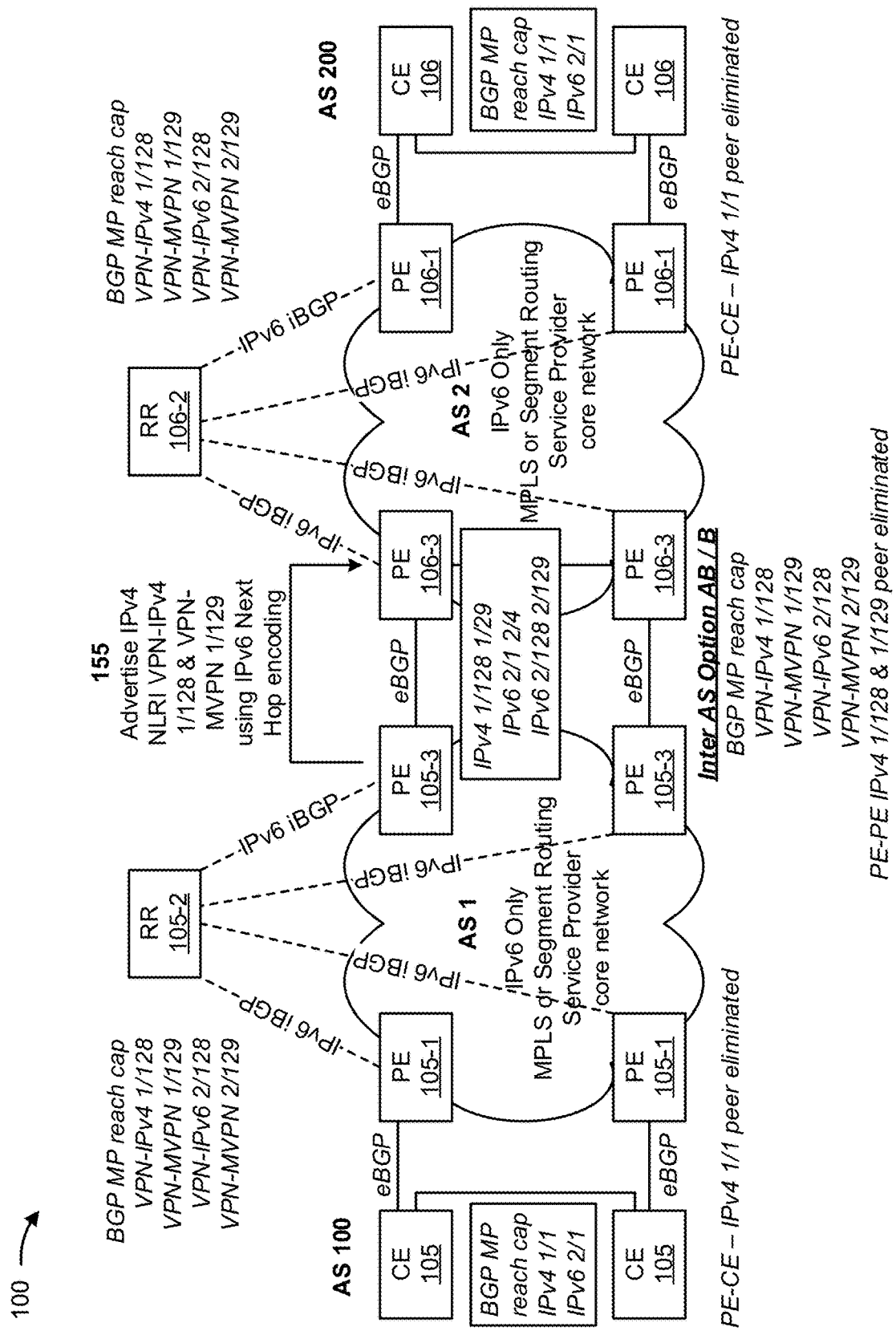
Figure 1E:
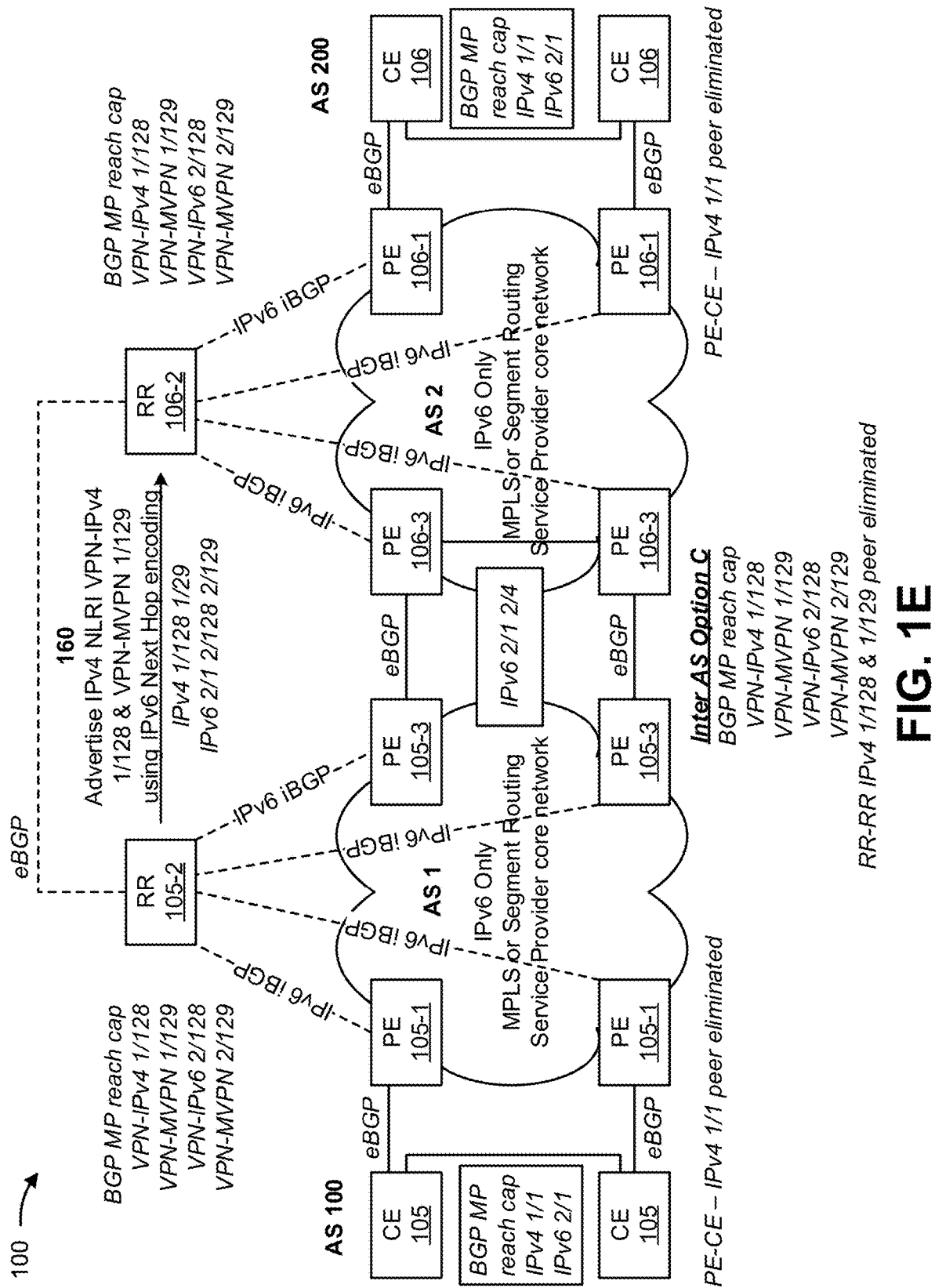

FIGS. 1A-1E are diagrams of an example 100 associated with advertising IPv4 NLRI with an IPv6 Next-Hop. In FIG. 1A, network device 105-3 and network device 106-3 are both capable of forwarding both IPv4 and IPv6 packets with an IPv6 address only configured on both network devices 105-3 and 106-3. In FIGS. 1B-1E, network device 105 and network device 105-1 are both capable of forwarding both IPv4 and IPv6 packets with an IPv6 address only configured on both network devices 105 and 105-1. In FIGS. 1D and 1E, network device 105-3 and network device 106-3 are both capable of forwarding both IPv4 and IPv6 packets with an IPv6 address only configured on both network devices 105-3 and 106-3. All network devices described herein have a control plane and data plane component, where the control plane is utilized for routing updates and advertising IPv4 and IPv6 NLRI information, the IPv4 data plane is used for forwarding of IPv4 packets, and the IPv6 data plane is used to forward IPv6 packets. Implementations described in FIGS. 1A-1E enable maintaining the same functionality of "Dual Stacking" where, by definition, both IPv4 address and IPv6 address are configured on the interfaces, but now by only having an IPv6 address configured on an interface, the functionality of "Dual Stacking" is still maintained, as IPv4 and IPv6 packets can still be forwarded. An IPv4 address is not required to be configured on an interface to forward IPv4 packets and an IPv6 address is not required to be configured on an interface to forward IPv6 packets. Such implementations are not configuring an IPv4 address to save on IPv4 address space and memory and can still forward IPv4 packets in the same manner that IPv4 packets are forwarded with an IPv4 address configured on the interface. FIGS. 1A-1E describe in detail the control plane routing advertisement of IPv4 NLRI and IPv6 NLRI within the data plane framework described above as being able to forward both IPv4 and IPv6 packets when only an IPv6 address is configured on the interfaces of all network devices described herein.

FIG. 1A depicts Service Provider to Service Provider IP-Only (Non MPLS) peering where IPv4 unicast NLRI and IPv6 unicast NLRI are advertised over an IPv6 next hop with a network interface configured with only an IPv6 address and may forward both IPv4 and IPv6 packets.

FIG. 1B depicts an MPLS or Segment Routing Enterprise IPv6-Only core network where the "Edge-Peering" IPv4 unicast NLRI and IPv6 unicast NLRI are advertised over an IPv6 next hop with a network interface configured with only an IPv6 address and may forward both IPv4 and IPv6 packets. FIG. 1B also represents the "Soft-Wire" mesh framework scenario where an IPv6 edge can be tunneled over an MPLS or Segment Routing Enterprise IPv4-Only core network where the "Edge-Peering" IPv4 unicast NLRI and IPv6 unicast NLRI are advertised over an IPv6 next hop with a network interface configured with only an IPv6 address and may forward both IPv4 and IPv6 packets.

FIG. 1C depicts an MPLS or Segment Routing Service Provider IPv6-Only core network where the "Edge-Peering" IPv4 unicast NLRI and IPv6 unicast NLRI are advertised over an IPv6 next hop with a network interface configured with only an IPv6 address and may forward both IPv4 and IPv6 packets. FIG. 1C also represents the "Soft-Wire" mesh framework scenario where an IPv6 edge can be tunneled over an MPLS or Segment Routing Service Provider IPv4-Only core network where the "Edge-Peering" IPv4 unicast NLRI and IPv6 unicast NLRI are advertised over an IPv6 next hop with a network interface configured with only an IPv6 address and may forward both IPv4 and IPv6 packets.

FIG. 1D depicts Inter-AS L3 VPN Option-B and Inter-AS L3 VPN Option-AB peering over an MPLS or Segment Routing Service Provider IPv6-Only core network where the "Edge-Peering" IPv4 unicast NLRI and IPv6 unicast NLRI are advertised over an IPv6 next hop with a network interface configured with only an IPv6 address and may forward both IPv4 and IPv6 packets. The Inter-AS L3 VPN Option-B and Inter-AS L3 VPN Option-AB peering of FIG. 1D also represents the "Soft-Wire" mesh framework scenario where an IPv6 edge can be tunneled over an MPLS or Segment Routing Service Provider IPv4-Only core network where the "Edge-Peering" IPv4 unicast NLRI and IPv6 unicast NLRI are advertised over an IPv6 next hop with a network interface configured with only an IPv6 address and may forward both IPv4 and IPv6 packets.

FIG. 1E depicts Inter-AS L3 VPN Option-C peering over an MPLS or Segment Routing Service Provider IPv6-Only core network where the "Edge-Peering" IPv4 unicast NLRI and IPv6 unicast NLRI are advertised over an IPv6 next hop with a network interface configured with only an IPv6 address and may forward both IPv4 and IPv6 packets. FIG. 1E also depicts the control plane Route Reflector to Route Reflector eBGP IPv6-Only peering where IPv4 unicast NLRI and IPv6 unicast NLRI are advertised over an IPv6 next hop with a network interface configured with only an IPv6 address and may forward both IPv4 and IPv6 control plane routing update packets. The Inter-AS L3 VPN Option-C of FIG. 1E also represents the "Soft-Wire" mesh framework scenario where an IPv6 edge can be tunneled over an MPLS or Segment Routing Service Provider IPv4-Only core network where the "Edge-Peering" IPv4 unicast NLRI and IPv6 unicast NLRI are advertised over an IPv6 next hop with a network interface configured with only an IPv6 address and capable of forwarding both IPv4 and IPv6 packets. FIG. 1E also depicts the control plane Route Reflector to Route Reflector eBGP IPv4-Only peering where IPv4 unicast NLRI and IPv6 unicast NLRI are advertised over an IPv4 next hop with a network interface configured with only an IPv4 address and forwarding both IPv4 and IPv6 control plane routing update packets.

FIGS. 1A-1E depict a few examples of the implementations, however the implementations apply to any infrastructure, Core, Data Center or Access layers of the network where "Dual Stacking" exists with separate IPv4 and IPv6 BGP peering can now utilize the implementations to advertise both IPv4 NLRI and IPv6 NLRI control plane routing updates with a single pure IPv6 Transport peer and continue to forward IPv4 and IPv6 packets in the forwarding plane with only IPv6 configured on the network interface.

As shown in FIGS. 1A-1E, example 100 may include an endpoint device 110, associated with a first servicer provider (SP) network (SP #1 network), hereinafter referred to as SP #1, that includes a first network device 105-3, communicating with a second service provider (SP) network (SP #2 network), hereinafter referred to as SP #2 that includes a second network device 106-3 which includes endpoint device 115. One or more of network devices 105 may include a router, a gateway, a switch, a firewall, a hub, a bridge, a reverse proxy, and/or the like. Endpoint device 110 may include a mobile phone (e.g., a smart phone or a radiotelephone), a laptop computer, a tablet computer, a desktop computer, and/or the like. Server device 115 may include a laptop computer, a tablet computer, a desktop computer, a group of server devices, or a similar type of device. Although FIGS. 1A-1E describe endpoint device 110 and server device 115 interacting with two network devices 105, in some implementations, endpoint device 110 and server device 115 may interact with additional or fewer network devices 105 in a similar manner.

As further shown in FIG. 1A, and by reference number 120, first network device 105-3 may establish an IPv6 session with second network device 106-3 associated with the second SP network. For example, first network device 105-3 may receive traffic from endpoint device 110 that is to be provided to server device 115 and may establish the IPv6 session with second network device 106-3 to provide the traffic to server device 115.

Alternatively, or additionally, first network device 105-3 which may be a PE network device of SP #1 "AS 1" may establish the IPv6 session with second network device 106-3 which may be a PE network device of SP #2 "AS 2" in order to advertise address information associated with first network device 105-3, the first SP network, and/or endpoint device 110 to second network device 106-3. For example, as shown in FIG. 1A, the first SP network may be associated with an IPv4 address (e.g., 192.1.1.0/24) and an IPv6 address (e.g., 2002::/48); first network device 105-3 with an IPv6 address (e.g., 2001:1); the second SP network may be associated with an IPv4 address (e.g., 193.1.1.0/24) and an IPv6 address (e.g., 2003::/48); and second network device 106-3 may be associated with an IPv6 address (e.g., 2001:: 2).

As further shown in FIG. 1A, and by reference number 125, first network device 105-3 may advertise IPv4 NLRI and IPv6 NLRI with an IPv6 Next-Hop encoding to second network device 106-3. The MP-BGP peering may include IPv4 AFI with any SAFI as well as IPv6 AFI with any SAFI. Since first network device 105-3 may utilize the single IPv6 BGP single peer session as a transport, first network device 105-3 may stack both AFI for both address families IPv4 and IPv6 and all corresponding SAFI using IPv6 Next-Hop encoding. In this way, first network device 105-3 may enable IPv4 NLRI to be transported over an IPv6 peer (e.g., first network device 105-3) with IPv6 Next-Hop encoding. This will eliminate the IPv4 eBGP "Edge-Peering" peering between PE network device 105-3 and PE network device 106-3 since a single IPv6 peer may be utilized as a transport to advertise both the IPv4 NLRI and the IPv6 NLRI.

In some implementations, the IPv4 and IPv6 address families (AFI) may include other SAFI, NLRI used for multicast forwarding, NLRI with multiprotocol label switching (MPLS) labels, NLRI used for a multicast VPN (MVPN), NLRI used for dynamic placement of a multi-segment pseudowire, NLRI used for BGP Tunnel Encapsulation Attribute, NLRI used for Multicast Virtual Private LAN Service (MCAST-VPLS), NLRI used for a Virtual Private LAN Service (VPLS), NLRI used for BGP Multicast Distribution Tree (MDT) SAFI, NLRI used for BGP 4over6 SAFI, NLRI used for BGP 6over4 SAFI, NLRI used for Layer-1 VPN auto-discovery information, NLRI used for a BGP Ethernet VPN (EVPN), NLRI used for BGP link state (BGP-LS), NLRI used for BGP link state VPN (BGP-LS-VPN), NLRI used for Segment Routing Traffic Engineering Policy (SR TE Policy) SAFI, NLRI used for software-defined networking (SDN) in a wide area network (WAN) capabilities, NLRI used for routing policy SAFI, NLRI used for classful transport SAFI, NLRI used for Tunneled Traffic Flow Specification (FLOWSPEC) rules, NLRI used for BGP Based Multicast (MCAST-TREE), NLRI used for MPLS Labeled Virtual Private Network (VPN), NLRI used for Multicast for BGP/MPLS IP Virtual Private Network (VPN), NLRI used for route target constraints (RTC), NLRI used for dissemination of flow specification (FLOWSPEC) rules, NLRI used for Layer 3 VPN dissemination of flow specification (FLOWSPEC) rules, NLRI used for VPN auto-discovery, and/or the like.

As further shown in FIG. 1A, and by reference number 130, first network device 105-3 may advertise the IPv4 NLRI to second network device 106-3 via a single IPv6 eBGP session. For example, first network device 105-3 may advertise IPv4 NLRI (e.g., 192.1.1.0/24) and the IPv6 NLRI (e.g., 2002::/48) using IPv6 Next-Hop (e.g., Next-Hop 2001::2) to second network device 106-3. In this way, first network device 105-3 and second network device 106-3 will eliminate or reduce IPv4 address depletion issues by eliminating IPv4 peering, may conserve memory address space, and may reduce expenditures in maintaining both IPv4 and IPv6 peering.

FIG. 1B is a diagram depicting how an IPv6 MPLS Enterprise Core network may transport IPv4 NLRI with an IPv6 Next-Hop. The MPLS enterprise Core network may include a network utilized by one or more enterprise systems. As shown in FIG. 1B, first network device 105-1 of "AS 1" may be a PE network device and second network device 105-2 of "AS 1" may be an RR network device. All PE network devices 105-1 and RR network devices 105-2 reside in "AS 1." Additional PE network devices 105-1 of "AS 1" have eBGP peering to CE network devices 105 of "AS 100" and "AS 200." Each PE network device 105-1 will communicate with a corresponding CE network device 105 via eBGP peering and may communicate with RR network device 105-2 via IPv6 iBGP peering.

As further shown in FIG. 1B, each CE network device 105 MP-BGP peer will exchange MP_REACH capability with a corresponding PE network device 105 for an AFI/SAFI capability being negotiated. For example, the MP_REACH capability may include an IPv4 unicast AFI/SAFI (e.g., 1/1) and an IPv6 unicast AFI/SAFI (e.g., 2/1). As further shown in FIG. 1B, and by reference number 135, CE network device 105 may advertise the IPv4 Unicast NLRI and IPv6 Unicast NLRI to PE network device 105-1 network device with IPv6 next hop encoding. This will eliminate the IPv4 eBGP "Edge-Peering" peering between PE network device 105-1 and CE network device 105 since a single IPv6 peer may be utilized as a transport to advertise both the IPv4 unicast NLRI and the IPv6 unicast NLRI. This will also eliminate all IPv4 peers and IPv4 interfaces and conserve resources associated with the network. RR network device 105-2 will exchange a MP_REACH capability with a corresponding PE network device 105-1 for an AFI/SAFI capability being negotiated.

As further shown in FIG. 1B, and by reference number 140, PE network device 105-1 may advertise the IPv4 labeled unicast to RR network device 105-2 via BGP-LU (4PE). For example, PE network device 105-1 may advertise IPv6 NLRI (e.g., 2/1-IPv6 unicast) and the IPv4 Labeled Unicast (e.g., 1/4-IPv4 Labeled Unicast-4PE) to RR network device. In this way, peering between PE network device 105-1 and RR network device 105-2 may be IPv6 only. For example, the MP_REACH capability may include an IPv4 BGP labeled unicast AFI/SAFI (e.g., 1/4 BGP-LU (4PE)) and an IPv6 unicast AFI/SAFI (e.g., 2/1). Note that in the PE network device 105-1 to RR network device 105-2 BGP peering, the iBGP peering is over an "IPv6-Only Core." Thus, no IPv4 BGP peering is eliminated in this scenario which has historically been the case even for IPv6 Edge over an IPv4 Core. However, in contrast all "Edge-Peering" can now take advantage of a single IPv6 transport style peering to carry all IPv4 NLRI stacked 2-tuple AFI/SAFI, where "Core-Peering" has historically has not had any saving in BGP peering reduction as the Core is either IPv4-Only or IPv6-Only.

FIG. 1C is a diagram depicting how an IPv6 MPLS service provider Core network may transport IPv4 NLRI with an IPv6 Next-Hop. The MPLS service provider Core network may include a network utilized by one or more service providers. As shown in FIG. 1C, first network device 105-1 of "AS 1" may be a PE network device and second network device 105-2 of "AS 1" may be an RR network device. All PE network devices 105-1 and RR network devices 105-2 reside in "AS 1." Additional PE network devices 105-1 of "AS 1" and CE network devices 105 of "AS 100" and "AS 200." Each PE network device 105 may communicate with a corresponding CE network device 105 via eBGP peering and may communicate with RR network device 105-2 via IPv6 iBGP peering.

As further shown in FIG. 1C, each CE network device 105 MP-BGP peer will exchange MP_REACH capability with a corresponding PE network device 105-1 for an AFI/SAFI capability being negotiated. For example, the MP_REACH capability may include an IPv4 unicast AFI/SAFI (e.g., 1/1) and an IPv6 unicast AFI/SAFI (e.g., 2/1). As further shown in FIG. 1C, and by reference number 145, CE network device 105 may advertise the IPv4 Unicast NLRI and IPv6 Unicast NLRI to PE network device 105-1 network device with IPv6 next hop encoding. This will eliminate the IPv4 eBGP "Edge-Peering" peering between PE network device 105-1 and CE network device 105, since a single IPv6 peer may be utilized as a transport to advertise both the IPv4 unicast NLRI and the IPv6 unicast NLRI. This will also eliminate all IPv4 peers and IPv4 interfaces and conserve resources associated with the network. RR network device 105-2 will exchange a MP_REACH capability with a corresponding PE network device 105-1 for an AFI/SAFI capability being negotiated. For example, the MP_REACH capability may include a VPN-IPv4 AFI/SAFI (e.g., 1/128), a VPN-multicast VPN (MVPN) IPv4 AFI/SAFI (e.g., 1/129), a VPN-IPv6 AFI/SAFI (e.g., 2/128), and a VPN-MVPN IPv6 AFI/SAFI (e.g., 2/129).

As further shown in FIG. 1C, and by reference number 145, PE network device 105-1 may advertise IPv4 NLRI and IPv6 NLRI with IPv6 NH encoding to RR network device 105-2. The IPv4 NLRI may include an IPv4 unicast NLRI, a VPN-IPv4 NLRI, a multicast VPN-IPv4 NLRI, and/or the like SAFIs for IPv4 address family. The IPv6 NLRI may include an IPv6 unicast NLRI, a VPN-IPv6 NLRI, a multicast VPN-IPv6 NLRI, and/or the like SAFIs for IPv6 address family. Since PE network device 105-1 may utilize BGP as a transport, PE network device 105-1 may stack all the IPv4 and IPv6 AFI/SAFI 2—tuple over single IPv6 transport peer using IPv6 Next-Hop encoding. Note that in the PE network device 105-1 to RR network device 105-2 BGP peering, the iBGP peering is over an "IPv6-Only Core." Thus, no IPv4 BGP peering is eliminated in this scenario which has historically been the case even for IPv6 Edge over an IPv4 Core. However, in contrast all "Edge-Peering" can now take advantage of a single IPv6 transport style peering to carry all IPv4 NLRI stacked 2-tuple AFI/SAFI, where "Core-Peering" has historically has not had any saving in BGP peering reduction as the Core is either IPv4-Only or IPv6-Only.

FIG. 1D is a diagram depicting how a first IPv6 Core network (e.g., a AS 1—shown to the left in FIG. 1D) may transport IPv4 NLRI with an IPv6 Next-Hop to a second IPv6 Core network (e.g., a AS 2—shown to the right in FIG. 1D). The network of the first AS and the second AS may be referred to as an Inter-AS Layer 3 VPN Option-AB network or an Inter-AS Layer 3 VPN Option-B network. As shown in FIG. 1D, first network device 105-1 may be a PE network device associated with the first AS "AS 1" and second network device 106-1 may be a PE network device associated with the second AS "AS 2." Additional PE network devices 105-1 "AS 1" and 106-1 "AS 2" respectively eBGP peering to CE network devices 105 "AS 100" and network device 106 "AS 200" respectively. Each PE network device 105-1 and 106-1 may communicate with a corresponding CE network device 105 and 106 via eBGP and may communicate with RR network devices 105-2 and 106-2 via IPv6 iBGP. Additional PE network devices 105-3 "AS 1" may communicate to PE network devices in a different AS 106-3 "AS 2" as Inter-AS Layer 3 VPN Option-AB or Option-B eBGP peering. Each PE network device 105-3 may communicate with PE network device 106-3 via eBGP peering and may communicate with RR network devices 105-2 and 106-2 via IPv6 iBGP peering.

PE network devices 105-1 and 106-1 will exchange a MP_REACH capability with RR network device 105-2 and 106-2 for an AFI/SAFI capability being negotiated. For example, the MP_REACH capability may include a VPN-IPv4 AFI/SAFI (e.g., 1/128), a VPN-multicast VPN (MVPN) IPv4 AFI/SAFI (e.g., 1/129), a VPN-IPv6 AFI/SAFI (e.g., 2/128), and a VPN-MVPN IPv6 AFI/SAFI (e.g., 2/129). PE network device 105-1 and 106-1 may advertise IPv4 NLRI and IPv6 NLRI using IPv6 Next-Hop encoding. The IPv4 NLRI advertised may include the VPN-IPv4 AFI/SAFI (e.g., 1/128) and the VPN-multicast VPN (MVPN) IPv4 AFI/SAFI (e.g., 1/129). The IPv6 NLRI advertised may include the VPN-IPv6 AFI/SAFI (e.g., 2/128) and the VPN-MVPN IPv6 AFI/SAFI (e.g., 2/129).

PE network device 105-3 in "AS 1" will exchange a MP_REACH capability with PE network device 106-3 in "AS-2" for an AFI/SAFI capability being negotiated for Inter-AS Layer 3 VPN ASBR to ASBR eBGP peering. For example, the MP_REACH capability may include a VPN-IPv4 AFI/SAFI (e.g., 1/128), a VPN-multicast VPN (MVPN) IPv4 AFI/SAFI (e.g., 1/129), a VPN-IPv6 AFI/SAFI (e.g., 2/128), and a VPN-MVPN IPv6 AFI/SAFI (e.g., 2/129). PE network device 105-3 may advertise IPv4 NLRI and IPv6 NLRI using IPv6 Next-Hop encoding to network device 106-3. The IPv4 NLRI advertised may include the VPN-IPv4 AFI/SAFI (e.g., 1/128) and the VPN-multicast VPN (MVPN) IPv4 AFI/SAFI (e.g., 1/129). The IPv6 NLRI advertised may include the VPN-IPv6 AFI/SAFI (e.g., 2/128) and the VPN-MVPN IPv6 AFI/SAFI (e.g., 2/129).

As further shown in FIG. 1D, and by reference number 155, PE network devices 105-3 and 106-3 may advertise IPv4 NLRI and IPv6 NLRI with IPv6 NH encoding to RR network device 105-2 and 106-2. The IPv4 NLRI may include an IPv4 unicast NLRI, a VPN-IPv4 NLRI, a multicast VPN-IPv4 NLRI, and/or the like SAFIs for IPv4 address family. The IPv6 NLRI may include an IPv6 unicast NLRI, a VPN-IPv6 NLRI, a multicast VPN-IPv6 NLRI, and/or the like SAFIs for IPv6 address family. Since PE network devices 105-3 and 106-3 may utilize BGP as a transport, PE network devices 105-3 and 106-3 may stack all the IPv4 and IPv6 AFI/SAFI 2—tuple over single IPv6 transport peer using IPv6 Next-Hop encoding. This will eliminate eBGP "Edge-Peering" Inter-AS Layer 3 VPN ASBR to ASBR peering between PE network device 105-3 "AS 1" and PE network device 106-3 "AS 2" since a single IPv6 peer may be utilized to transport both the IPv4 NLRI and the IPv6 NLRI. This will also eliminate all IPv4 peers and IPv4 interfaces and conserve resources associated with the network. Note that in the PE network device 105-3 to RR network device 105-2 BGP peering, the iBGP peering is over an "IPv6-Only Core." Thus, no IPv4 BGP peering is eliminated in this scenario which has historically been the case even for IPv6 Edge over an IPv4 Core. However, in contrast all "Edge-Peering" can now take advantage of a single IPv6 transport style peering to carry all IPv4 NLRI stacked 2-tuple AFI/SAFI where "Core-Peering" has historically not had any saving in BGP peering reduction as the Core is either IPv4-Only or IPv6-Only.

FIG. 1E is a diagram depicting how a first IPv6 Core network (e.g., a AS 1—shown to the left in FIG. 1E) may transport IPv4 NLRI with an IPv6 Next-Hop to a second IPv6 Core network (e.g., a AS 2—shown to the right in FIG. 1E). The network of the first AS and the second AS may be referred to as an Inter-AS Layer 3 VPN Option-C. As shown in FIG. 1E, first network device 105-1 may be a PE network device associated with the first AS "AS 1" and second network device 106-1 may be a PE network device associated with the second AS "AS 2." Additional PE network devices 105-1 "AS 1" and 106-1 "AS 2" respectively eBGP peering to CE network devices 105 "AS 100" and network device 106 "AS 200" respectively. Each PE network device 105-1 and 106-1 may communicate with a corresponding CE network device 105 and 106 via eBGP and may communicate with RR network devices 105-2 and 106-2 via IPv6 iBGP. Additional PE network devices 105-3 "AS 1" may communicate to PE network devices in a different AS 106-3 "AS 2" as Inter-AS Layer 3 VPN Option-C eBGP peering. Each PE network device 105-3 may communicate with PE network device 106-3 via eBGP and may communicate with RR network devices 105-2 and 106-2 via IPv6 iBGP. Additional RR network devices 105-2 "AS 1" may communicate to RR network devices in a different AS 106-2 "AS 2" as Inter-AS Layer 3 VPN Option-C eBGP peering. Each RR network device 105-2 may communicate with RR network device 106-2 via eBGP peering and may communicate with PE network devices 105-1, 105-3 and 106-1 and 106-3 within the same AS via IPv6 iBGP peering.

PE network devices 105-1 and 106-1 will exchange a MP_REACH capability with RR network device 105-2 and 106-2 for an AFI/SAFI capability being negotiated. For example, the MP_REACH capability may include a VPN-IPv4 AFI/SAFI (e.g., 1/128), a VPN-multicast VPN (MVPN) IPv4 AFI/SAFI (e.g., 1/129), a VPN-IPv6 AFI/SAFI (e.g., 2/128), and a VPN-MVPN IPv6 AFI/SAFI (e.g., 2/129). PE network devices 105-1 and 106-1 may advertise IPv4 NLRI and IPv6 NLRI using IPv6 Next-Hop encoding. The IPv4 NLRI advertised may include the VPN-IPv4 AFI/SAFI (e.g., 1/128) and the VPN-multicast VPN (MVPN) IPv4 AFI/SAFI (e.g., 1/129). The IPv6 NLRI advertised may include the VPN-IPv6 AFI/SAFI (e.g., 2/128) and the VPN-MVPN IPv6 AFI/SAFI (e.g., 2/129).

RR network device 105-2 of "AS 1" will exchange a MP_REACH capability with RR network device 106-2 of "AS 2" for an AFI/SAFI capability being negotiated RR to RR Inter-AS Layer 3 VPN Option-C eBGP peering. For example, the MP_REACH capability may include a VPN-IPv4 AFI/SAFI (e.g., 1/128), a VPN-multicast VPN (MVPN) IPv4 AFI/SAFI (e.g., 1/129), a VPN-IPv6 AFI/SAFI (e.g., 2/128), and a VPN-MVPN IPv6 AFI/SAFI (e.g., 2/129). PE network devices 105-2 and 106-2 may advertise IPv4 NLRI and IPv6 NLRI using IPv6 Next-Hop encoding. The IPv4 NLRI advertised may include the VPN-IPv4 AFI/SAFI (e.g., 1/128) and the VPN-multicast VPN (MVPN) IPv4 AFI/SAFI (e.g., 1/129). The IPv6 NLRI advertised may include the VPN-IPv6 AFI/SAFI (e.g., 2/128) and the VPN-MVPN IPv6 AFI/SAFI (e.g., 2/129).

PE network device 105-3 in "AS 1" will exchange a MP_REACH capability with PE network device 106-3 in "AS-2" for an AFI/SAFI capability being negotiated for Inter-AS Layer 3 VPN Option-C PE-PE (ASBR-ASBR) eBGP peering. For example, the MP_REACH capability may include an IPv6 BGP labeled unicast AFI/SAFI (e.g., 2/4 BGP-LU) and an IPv6 unicast AFI/SAFI (e.g., 2/1). PE network device 105-3 may advertise IPv4 NLRI and IPv6 NLRI using IPv6 Next-Hop encoding to network device 106-3. The IPv4 NLRI advertised may include the IPv6 BGP labeled unicast AFI/SAFI (e.g., 2/4 BGP-LU) and an IPv6 unicast AFI/SAFI (e.g., 2/1).

RR network device 105-2 may advertise IPv4 NLRI and IPv6 NLRI with IPv6 NH encoding to RR network device 106-2. The IPv4 NLRI may include an IPv4 unicast NLRI, a VPN-IPv4 NLRI, a multicast VPN-IPv4 NLRI, and/or the like SAFIs for IPv4 address family. The IPv6 NLRI may include an IPv6 unicast NLRI, a VPN-IPv6 NLRI, a multicast VPN-IPv6 NLRI, and/or the like SAFIs for IPv6 address family. Since RR network devices 105-2 and 106-2 may utilize BGP as a transport, RR network devices 105-2 and 106-2 may stack all the IPv4 and IPv6 AFI/SAFI 2—tuple over single IPv6 transport peer using IPv6 Next-Hop encoding. This will eliminate the Inter-AS Layer 3 VPN Option-C RR to RR IPv4 eBGP "Edge-Peering" peering between RR network device 105-2 "AS 1" and RR network device 106-2 "AS 2," since a single IPv6 peer may be utilized to transport both the IPv4 NLRI and the IPv6 NLRI. This will also eliminate all IPv4 peers and IPv4 interfaces and conserve resources associated with the network.

As further shown in FIG. 1E, and by reference number 160, PE network devices 105-3 and 106-3 may advertise IPv4 NLRI and IPv6 NLRI with IPv6 NH encoding to RR network device 105-2 and 106-2. The IPv4 NLRI may include an IPv4 unicast NLRI, a VPN-IPv4 NLRI, a multicast VPN-IPv4 NLRI, and/or the like SAFIs for IPv4 address family. The IPv6 NLRI may include an IPv6 unicast NLRI, a VPN-IPv6 NLRI, a multicast VPN-IPv6 NLRI, and/or the like SAFIs for IPv6 address family. Note that in the PE network device 105-3 to RR network device 105-2 BGP peering, the iBGP peering is over an "IPv6-Only Core." Thus, no IPv4 BGP peering is eliminated in this scenario which has historically been the case even for IPv6 Edge over an IPv4 Core. However, in contrast all "Edge-Peering" can now take advantage of a single IPv6 transport style peering to carry all IPv4 NLRI stacked 2-tuple AFI/SAFI where "Core-Peering" has historically has not had any saving in BGP peering reduction as the Core is either IPv4-Only or IPv6-Only.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
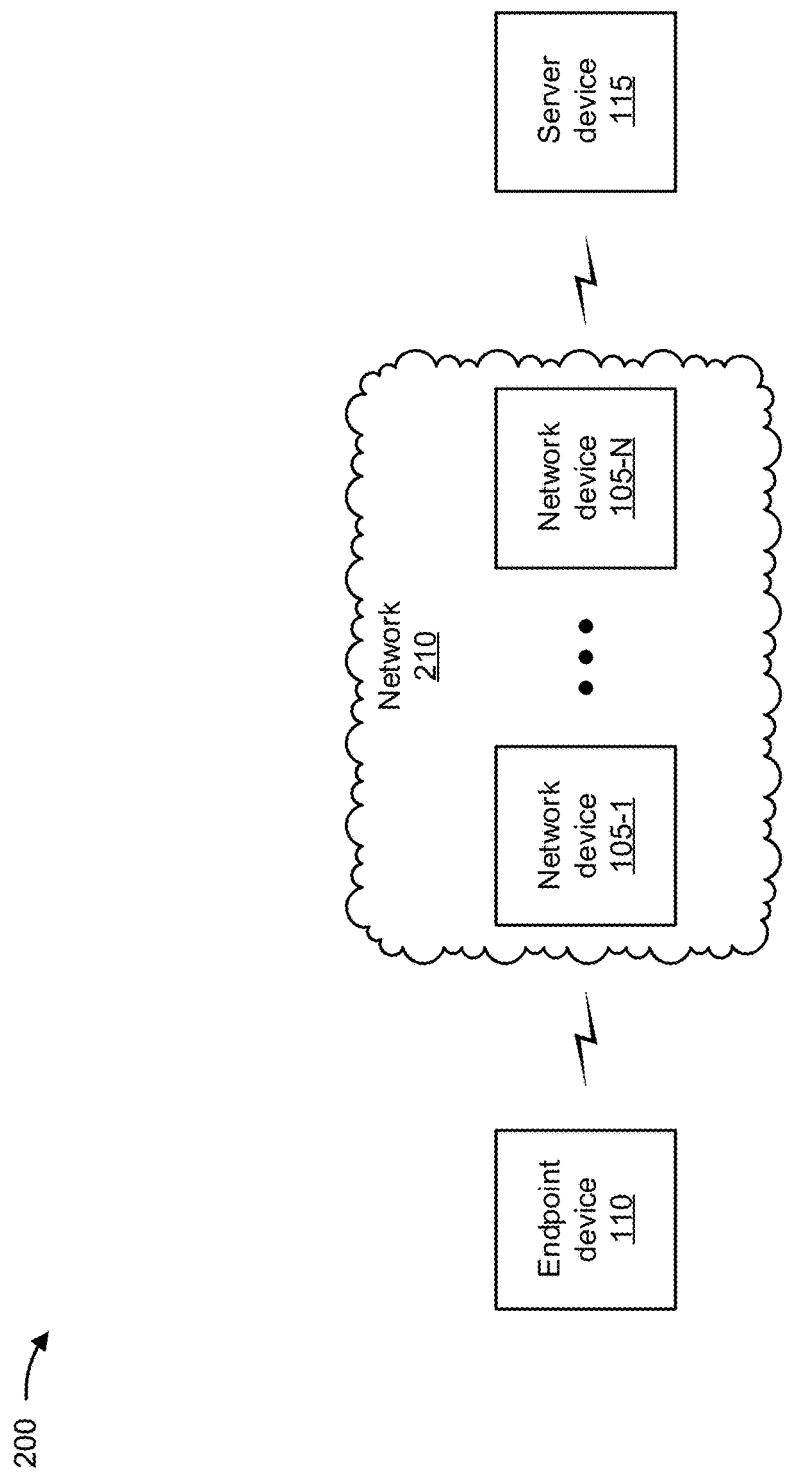
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a group of network devices 105 (shown as network device 105-1 through network device 105-N), endpoint device 110, server device 115, and a network 210. Devices of environment 200 may interconnect via wired connections, wireless connections, or a combination of wired and wireless connections.

Network device 105 includes one or more devices capable of receiving, processing, storing, routing, and/or providing traffic (e.g., a packet or other information or metadata) in a manner described herein. For example, network device 105 may include a router, such as a label switching router (LSR), a label edge router (LER), an ingress router, an egress router, a provider edge router (e.g., a provider edge router or a provider Core router), a virtual router, or another type of router. Additionally, or alternatively, network device 105 may include a gateway, a switch, a firewall, a hub, a bridge, a reverse proxy, a server (e.g., a proxy server, a cloud server, or a data center server), a load balancer, and/or a similar device. In some implementations, network device 105 may be a physical device implemented within a housing, such as a chassis. In some implementations, network device 105 may be a virtual device implemented by one or more computer devices of a cloud computing environment or a data center. In some implementations, a group of network devices 105 may be a group of data center nodes that are used to route traffic flow through network 210.

Endpoint device 110 includes one or more devices capable of receiving, generating, storing, processing, and/or providing information, such as information described herein. For example, endpoint device 110 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, endpoint device 110 may receive network traffic from and/or may provide network traffic to other endpoint devices 110 and/or server device 115, via network 210 (e.g., by routing packets using network devices 105 as intermediaries).

Server device 115 includes one or more devices capable of receiving, generating, storing, processing, and/or providing information, such as information described herein. For example, server device 115 may include a laptop computer, a tablet computer, a desktop computer, a group of server devices, or a similar type of device. In some implementations, server device 115 may receive information from and/or transmit information (e.g., traffic) to endpoint device 110, via network 210 (e.g., by routing packets using network devices 105 as intermediaries).

Network 210 includes one or more wired and/or wireless networks. For example, network 210 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
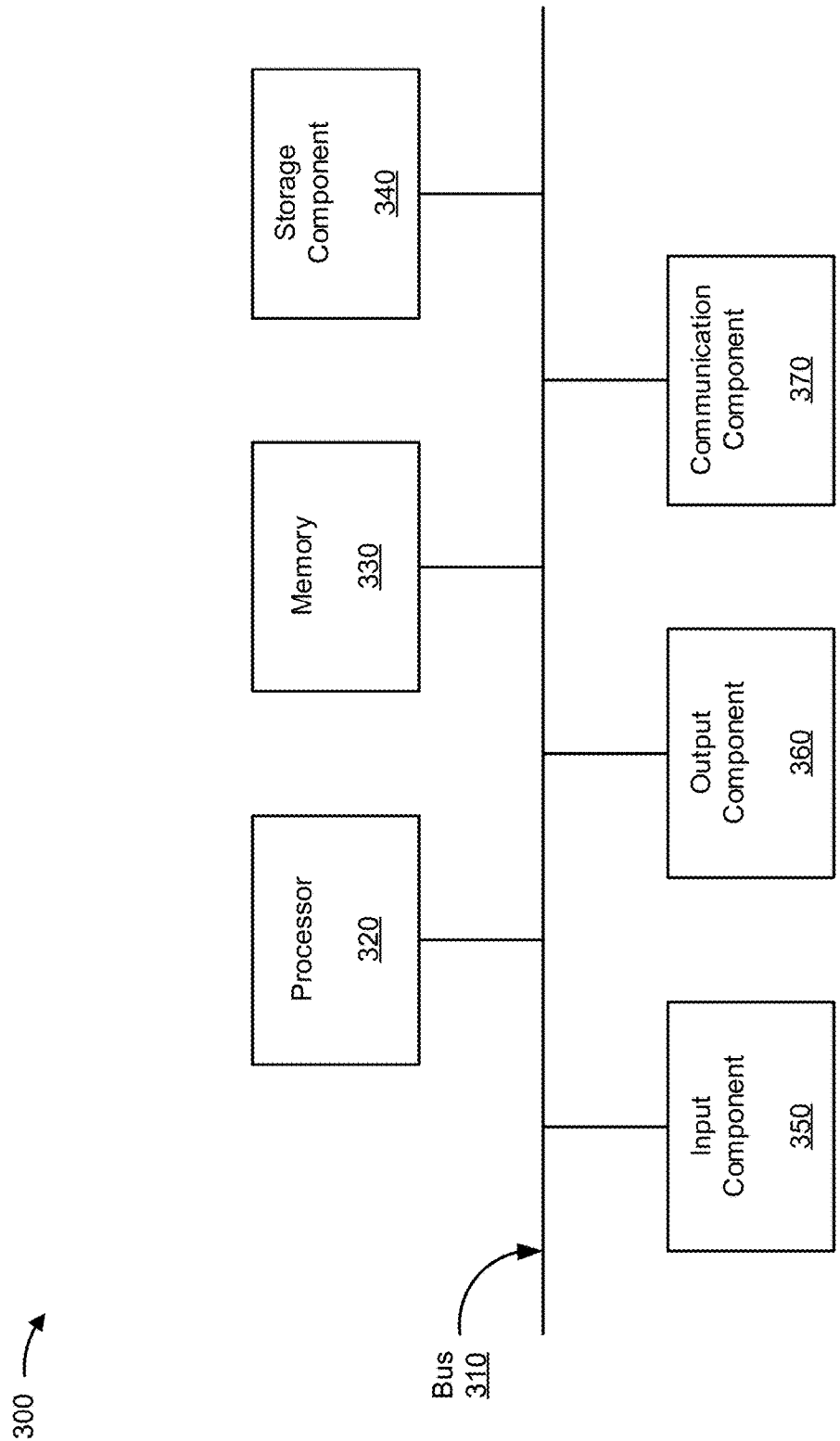
FIGS. 3 and 4 are diagrams of example components of one or more devices of FIG. 2.

FIG. 3 is a diagram of example components of one or more devices of FIG. 2. The example components may be included in a device 300, which may correspond to network device 105, endpoint device 110, and/or server device 115. In some implementations, network device 105, endpoint device 110, and/or server device 115 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random-access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
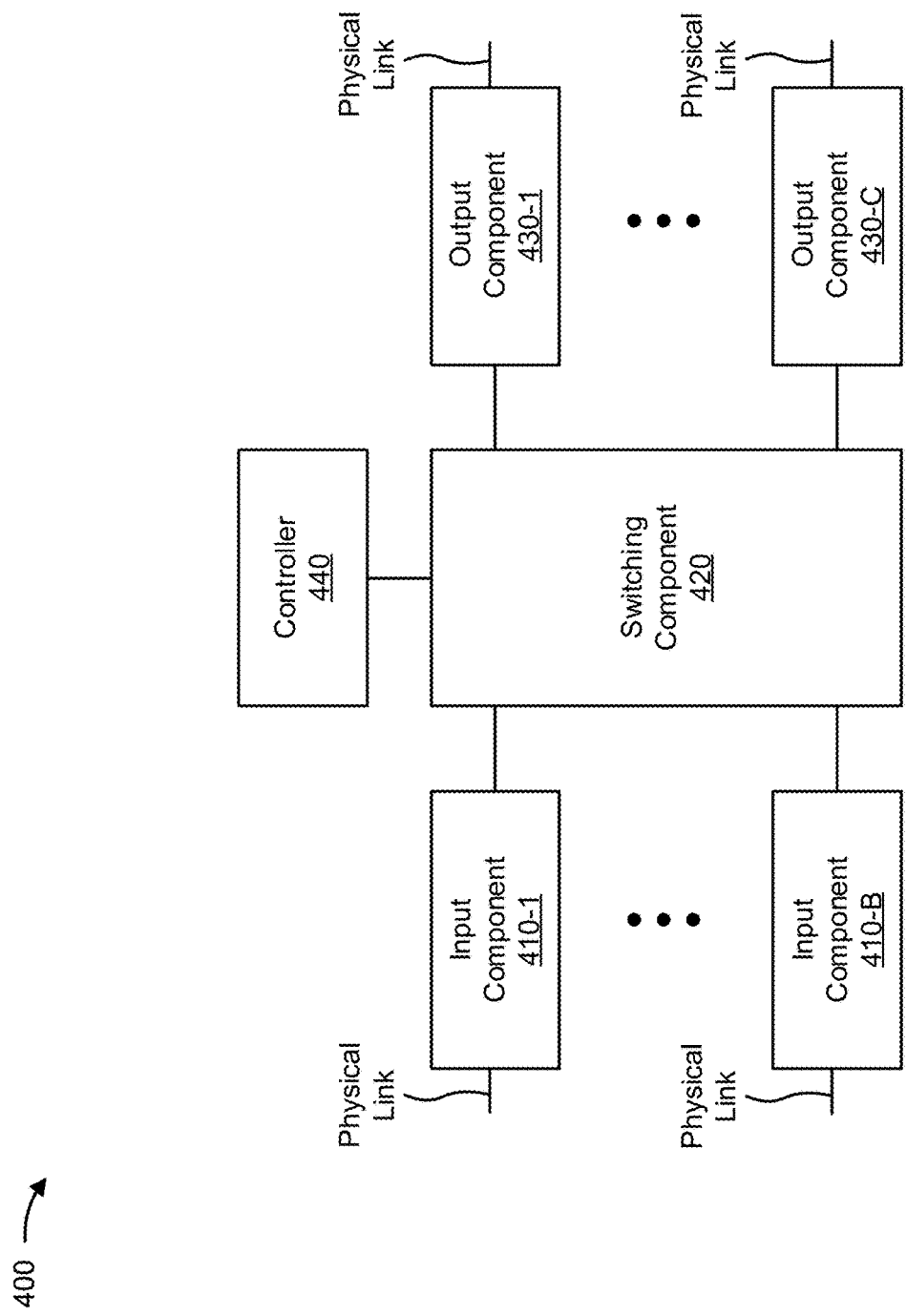

FIG. 4 is a diagram of example components of one or more devices of FIG. 2. The example components may be included in a device 400. Device 400 may correspond to network device 105. In some implementations, network device 105 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C(C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
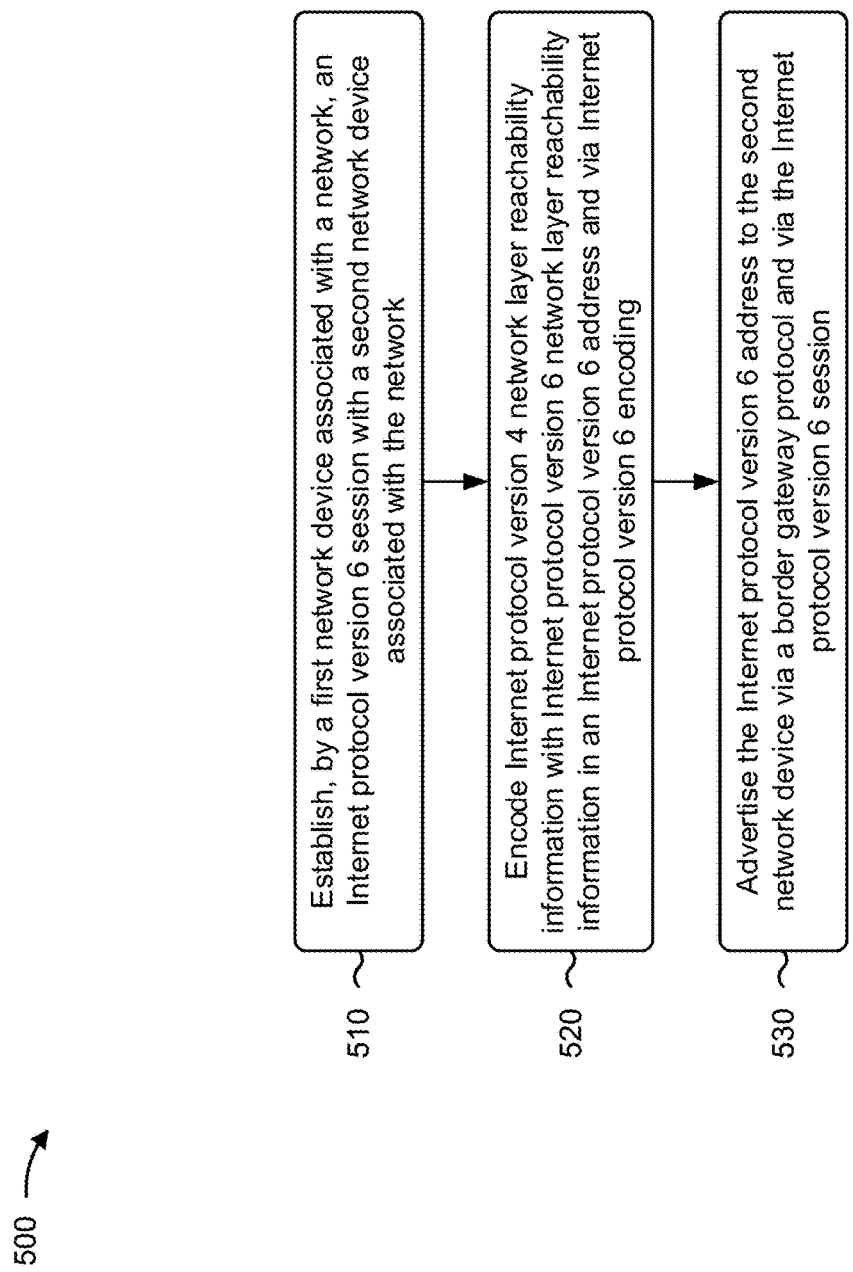
FIG. 5 is a flowchart of an example process for advertising IPv4 NLRI with an IPv6 Next-Hop.

FIG. 5 is a flowchart of an example process 500 for advertising IPv4 NLRI with an IPv6 Next-Hop. In some implementations, one or more process blocks of FIG. 5 may be performed by a network device (e.g., network device 105). In some implementations, one or more process blocks of FIG. 5 may be performed by another device or a group of devices separate from or including the device, such as an endpoint device (e.g., endpoint device 110) and/or a server device (e.g., server device 115). Additionally, or alternatively, one or more process blocks of FIG. 5 may be performed by one or more components of device 300, such as processor 320, memory 330, storage component 340, input component 350, output component 360, and/or communication component 370. Additionally, or alternatively, one or more process blocks of FIG. 5 may be performed by one or more components of device 400, such as input component 410, switching component 420, output component 430, and/or controller 440.

As shown in FIG. 5, process 500 may include establishing an Internet protocol version 6 session with a second network device associated with a network (block 510). For example, the first network device may establish an Internet protocol version 6 session with a second network device associated with a network, as described above.

As further shown in FIG. 5, process 500 may include encoding Internet protocol version 4 network layer reachability information with Internet protocol version 6 network layer reachability information in an Internet protocol version 6 address and via Internet protocol version 6 encoding (block 520). For example, the first network device may encode Internet protocol version 4 network layer reachability information with Internet protocol version 6 network layer reachability information in an Internet protocol version 6 address and via Internet protocol version 6 encoding, as described above.

As further shown in FIG. 5, process 500 may include advertising the Internet protocol version 6 address to the second network device via a border gateway protocol and via the Internet protocol version 6 session (block 530). For example, the first network device may advertise the Internet protocol version 6 address to the second network device via a border gateway protocol and via the Internet protocol version 6 session, as described above.

Process 500 may include additional implementations, such as any single implementation or any combination of implementations described below and/or in connection with one or more other processes described elsewhere herein.

In a first implementation, the Internet protocol version 6 network layer reachability information is an Internet protocol version 6 Next-Hop address.

In a second implementation, alone or in combination with the first implementation, the network includes a first service provider network associated with the first network device and a second service provider network associated with the second network device.

In a third implementation, alone or in combination with one or more of the first and second implementations, the network includes one or more of an Internet protocol version 6 multiprotocol label switching enterprise Core network, an Internet protocol version 6 multiprotocol label switching service provider Core network, or a network with a first autonomous system and a second autonomous system.

In a fourth implementation, alone or in combination with one or more of the first through third implementations, the Internet protocol version 4 network layer reachability information includes a combination of an address family identifier and a subsequent address family identifier.

In a fifth implementation, alone or in combination with one or more of the first through fourth implementations, the Internet protocol version 4 network layer reachability information includes an Internet protocol version 4 unicast identifier, a virtual private network Internet protocol version 4 identifier, or a multicast virtual private network Internet protocol version 4 identifier, and the Internet protocol version 6 network layer reachability information includes an Internet protocol version 6 unicast identifier, a virtual private network Internet protocol version 6 identifier, or a multicast virtual private network Internet protocol version 6 identifier.

In a sixth implementation, alone or in combination with one or more of the first through fifth implementations, the first network device is a provider edge network device and the second network device is a route reflector network device.

In a seventh implementation, alone or in combination with one or more of the first through sixth implementations, the network includes a first network and a second network, the first network device is a provider edge network device of the first network, and the second network device is a provider edge network device of the second network.

In an eighth implementation, alone or in combination with one or more of the first through seventh implementations, the network includes a first network and a second network, the first network device is a route reflector network device of the first network, and the second network device is a route reflector network device of the second network.

In a ninth implementation, alone or in combination with one or more of the first through eighth implementations, the Internet protocol version 6 address eliminates Internet protocol version 4 network devices and Internet protocol version 4 interfaces associated with the network.

In a tenth implementation, alone or in combination with one or more of the first through ninth implementations, process 500 includes utilizing the Internet protocol version 6 address to advertise one or more of network layer reachability information used for multicast forwarding, network layer reachability information with multiprotocol label switching labels, a multicast virtual private network, network layer reachability information used for dynamic placement of a multi-segment pseudowire, a multicast virtual private local area network service, a tunnel subsequent address family identifier, a virtual private local area network service, a border gateway protocol multicast decision tree subsequent address family identifier, a border gateway protocol 4over6 subsequent address family identifier, a border gateway protocol 6over4 subsequent address family identifier, Layer-1 virtual private network auto-discovery information, a border gateway protocol Ethernet virtual private network, a border gateway protocol link state, a border gateway protocol link state virtual private network, a segment routing for traffic engineering policy subsequent address family identifier, software-defined networking in a wide area network capabilities, a routing policy subsequent address family identifier, a classful transport subsequent address family identifier, tunneling traffic flow specification rules, routing target constraints, dissemination of flow specification rules, or virtual private network auto-discovery.

In an eleventh implementation, alone or in combination with one or more of the first through tenth implementations, the network includes an Internet protocol version 6 Core network and advertising the Internet protocol version 6 address to the second network device includes advertising the Internet protocol version 6 address to the second network device over the Internet protocol version 6 Core network.

In a twelfth implementation, alone or in combination with one or more of the first through eleventh implementations, process 500 includes utilizing the Internet protocol version 6 address to advertise a multiprotocol label switching-labeled virtual private network address, and multicasting for a border gateway protocol-multiprotocol label switching Internet protocol virtual private network.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   encoding, by a network device, Internet protocol version 4 network layer reachability information with Internet protocol version 6 network layer reachability information in an Internet protocol version 6 address and via Internet protocol version 6 encoding; and
   advertising, by the network device and over an Internet protocol version 6 Core network, the Internet protocol version 6 address via a border gateway protocol and via an Internet protocol version 6 session.

2. The method of claim 1, further comprising:
establishing a single Internet protocol version 6 session acting as a pure transport mechanism with a second network device associated with the Internet protocol version 6 Core network.

3. The method of claim 1, further comprising:
utilizing the Internet protocol version 6 address to advertise a multiprotocol label switching-labeled virtual private network address and multicast for a border gateway protocol-multiprotocol label switching Internet protocol virtual private network.

4. The method of claim 1, wherein the Internet protocol version 4 network layer reachability information includes an Internet protocol version 4 unicast identifier, a virtual private network Internet protocol version 4 identifier, or a multicast virtual private network Internet protocol version 4 identifier.

5. The method of claim 1, wherein the Internet protocol version 6 network layer reachability information includes an Internet protocol version 6 unicast identifier, a virtual private network Internet protocol version 6 identifier, or a multicast virtual private network Internet protocol version 6 identifier.

6. The method of claim 1, wherein the Internet protocol version 6 Core network includes a route reflector network device.

7. The method of claim 1, wherein Internet protocol version 4 network layer reachability information and Internet protocol version 6 network layer reachability information are advertised over an Internet protocol version 6 next hop.

8. A network device, comprising:
one or more processors configured to:
encode Internet protocol version 4 network layer reachability information with Internet protocol version 6 network layer reachability information in an Internet protocol version 6 address and via Internet protocol version 6 encoding; and
advertise, over an Internet protocol version 6 Core network, the Internet protocol version 6 address via an Internet protocol version 6 session,
wherein Internet protocol version 4 network layer reachability information and Internet protocol version 6 network layer reachability information are advertised over an IPv6 next hop.

9. The network device of claim 8, wherein the Internet protocol version 6 Core network includes
a provider edge network device.

10. The network device of claim 8, wherein the one or more processors are further configured to:
establish the Internet protocol version 6 session with a second network device to provide traffic to a server device.

11. The network device of claim 8, wherein the Internet protocol version 6 address eliminates Internet protocol version 4 network devices and Internet protocol version 4 interfaces associated with the Internet protocol version 6 Core network.

12. The network device of claim 8, wherein the one or more processors are further configured to:
utilize the Internet protocol version 6 address to advertise network layer reachability information.

13. The network device of claim 8, utilize the Internet protocol version 6 address to advertise a multiprotocol label switching-labeled virtual private network address and multicast for a border gateway protocol-multiprotocol label switching Internet protocol virtual private network.

14. The network device of claim 8, wherein the one or more processors are further configured to:
utilize the Internet protocol version 6 address to advertise:
a multiprotocol label switching-labeled virtual private network address, and
multicast for a border gateway protocol-multiprotocol label switching Internet protocol virtual private network.

15. A non-transitory computer-readable medium storing a set of instructions, the set of instructions comprising:
one or more instructions that, when executed by one or more processors of a first network device, cause the first network device to:
encode Internet protocol version 4 network layer reachability information with Internet protocol version 6 network layer reachability information in an Internet protocol version 6 address and via Internet protocol version 6 encoding,
advertise, over an Internet protocol version 6 Core network, the Internet protocol version 6 address to a second network device,
wherein Internet protocol version 4 network layer reachability information and Internet protocol version 6 network layer reachability information are advertised over an Internet protocol version 6 next hop.

16. The non-transitory computer-readable medium of claim 15, wherein the Internet protocol version 6 Core network further includes one or more of:
a first service provider network associated with the first network device and a second service provider network associated with the second network device, or
another network with a first autonomous system and a second autonomous system.

17. The non-transitory computer-readable medium of claim 15, wherein the Internet protocol version 4 network layer reachability information includes an Internet protocol version 4 unicast identifier, a virtual private network Internet protocol version 4 identifier, or a multicast virtual private network Internet protocol version 4 identifier, and
wherein the Internet protocol version 6 network layer reachability information includes an Internet protocol version 6 unicast identifier, a virtual private network Internet protocol version 6 identifier, or a multicast virtual private network Internet protocol version 6 identifier.

18. The non-transitory computer-readable medium of claim 15, wherein the second network device is a route reflector network device.

19. The non-transitory computer-readable medium of claim 15, wherein the one or more instructions further cause the first network device to:
utilize the Internet protocol version 6 address to advertise a multiprotocol label switching-labeled virtual private network address and multicast for a border gateway protocol-multiprotocol label switching Internet protocol virtual private network.

20. The non-transitory computer-readable medium of claim 15, wherein the one or more instructions further cause the first network device to:
establish a single Internet protocol version 6 session acting as a pure transport mechanism with the second network device associated with the Internet protocol version 6 Core network.

* * * * *